| (12) | United States Patent<br>Ramamurthy et al. | (10) Patent No.: US 7,506,212 B2<br>(45) Date of Patent: Mar. 17, 2009 |
|---|---|---|

(54) DISTRIBUTED EXCEPTION HANDLING TESTING

(75) Inventors: Ranjani Ramamurthy, Bellevue, WA (US); Shriram Lakshmi, Redmond, WA (US); Raja D. Venugopal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 491 days.

(21) Appl. No.: 11/283,574

(22) Filed: Nov. 17, 2005

(65) Prior Publication Data

US 2007/0168743 A1    Jul. 19, 2007

(51) Int. Cl.
*G06F 11/00*    (2006.01)
(52) U.S. Cl. .......................................... 714/38; 714/37
(58) Field of Classification Search ................... 714/36, 714/38, 37; 717/124, 125, 126
See application file for complete search history.

(56) References Cited

U.S. PATENT DOCUMENTS

| 6,944,799 B1 * | 9/2005 | Seeley et al. .................. 714/47 |
| 6,983,400 B2 * | 1/2006 | Volkov ......................... 714/38 |
| 7,000,224 B1 * | 2/2006 | Osborne et al. ............. 717/125 |

* cited by examiner

*Primary Examiner*—Dieu-Minh Le

(57) ABSTRACT

A distributed testing system for testing exception handling code paths is provided. The system may include multiple workstations configured to distributively test an executable component for exception handling. Each workstation includes a local data structure with data indicating code paths that have been traversed by a test performed by the workstation. The system includes a central data structure that is accessible by the workstations. By synchronizing with the central data structure, the local data structures can include data about code paths that have been traversed by the workstations in the system. Each workstation may use the synchronized, local data structure to determine previously traversed code paths and use this information to configure further tests.

20 Claims, 7 Drawing Sheets

DISTRIBUTED EXCEPTION HANDLING TESTING

BACKGROUND

One important type of software testing involves triggering exceptions in code under different conditions. An exception handling test is typically designed to be exhaustive so that all significant exceptions of the code are tested. Particularly, exhaustive exception handling testing is typically configured to simulate faults by executing through all possible paths of the code. The computing power and resources required to run through tens of millions of exception handling code paths in a typical server product can be daunting.

SUMMARY following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a distributed testing system for testing exception handling code paths. The system may include multiple workstations configured to distributively test an executable component for exception handling. Each workstation includes a local data structure with data indicating code paths that have been traversed by a test performed by the workstation. The system includes a central data structure that is accessible by the workstations. By synchronizing with the central data structure, the local data structures can include data about code paths that have been traversed by the other workstations in the system. Each workstation may use the synchronized, local data structure to determine previously traversed code paths and use this information to configure further tests.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a distributed exception handling testing system, the system described is provided as an example and not a limitation. As those skilled in the art will appreciate, the present examples are suitable for application in a variety of different types of distributed computing systems.

Figure 1:
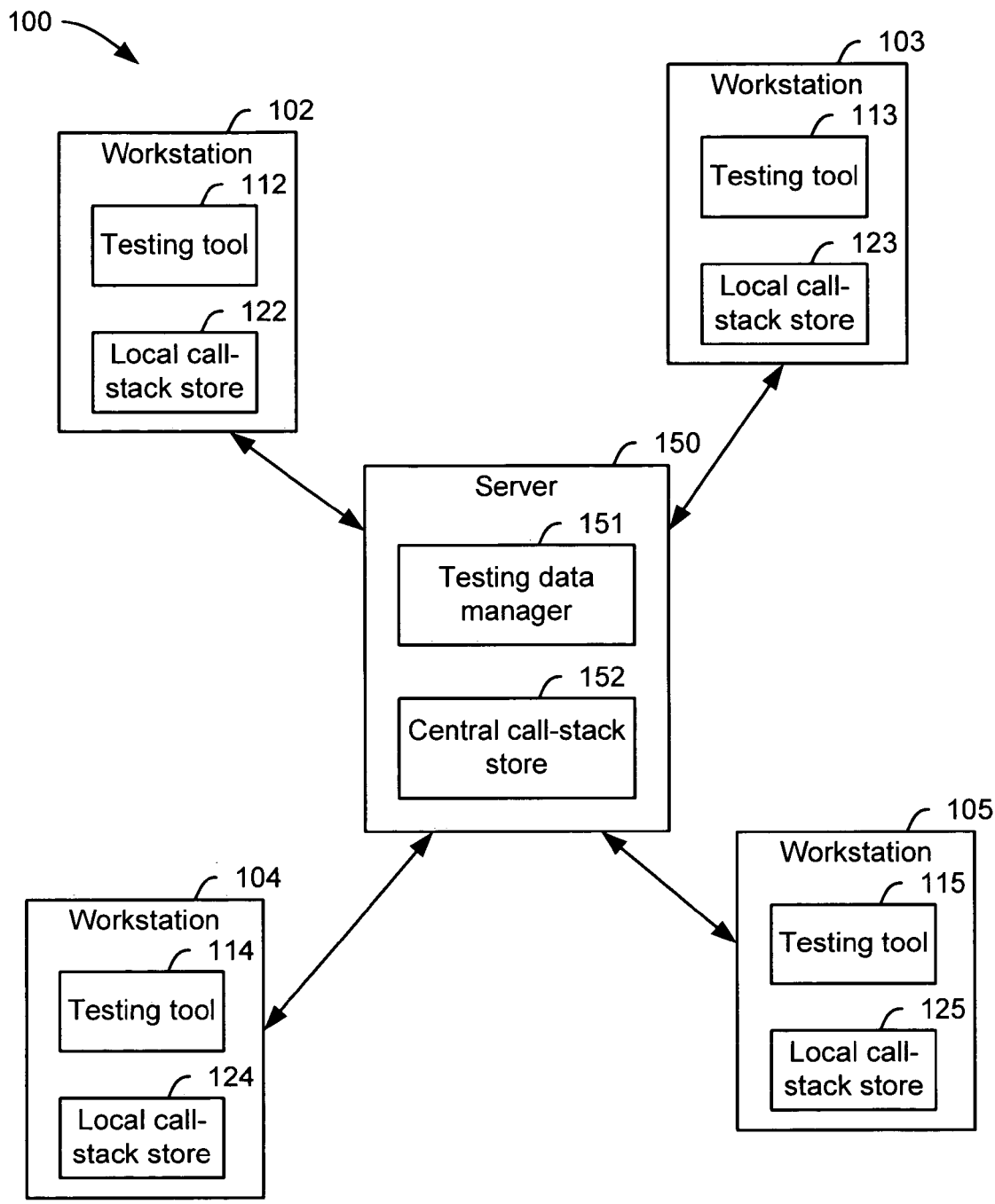
FIG. 1 shows an example software testing system with distributed exception handling capabilities.

FIG. 1 shows an example software testing system 100 with distributed exception handling capabilities. Example system 100 may include workstations 102-105 and server 150. Workstations 102-105 are configured to provide an operating environment for testing computer-executable components and can be any type of computing devices, such as servers, personal computers, mobile devices, and the like. As shown in FIG. 1, workstations 102-105 may include testing tools 112-115 and local call-stack store 122-125.

Testing tools 112-115 are configured to test executable components, such as applications, operating systems, subroutines, functions, scripts, and the like. In particular, testing tools 112-115 are configured to determine the exceptions that can occur during the execution of an executable component. These exceptions may include any faults, such as program errors, memory faults, machine crashes, bugs, and the like. Testing tools 112-115 are also configured to perform distributed testing of a particular executable component. For example, testing tools 112-115 are typically arranged so that each tool is configured to test particular paths of the code associated with the executable component. As the code paths are traversed during a test, testing tools 112-115 may represent these traversed code paths by hashed stacks and persist the stacks on local call-stack stores 122-125.

Testing tools 112-115 is configured to interact with server 150 to provide and receive data associated with the testing of executable components. As shown in FIG. 1, server 150 may include testing data manager 151 that is configured to manage central call-stack store 152. Specifically, testing data manager 151 is configured to receive from workstations 102-105 information about the testing done by each of testing tools 122-125. The information typically includes code paths that have been traversed by testing tools 122-125. In one implementation, the information is provided by synchronizing data in local call-stack stores 122-125 with data in central call-stack store 152 in server 150. Local call-stack stores 122-125 and central call-stack store 152 may be implemented in any type of data structures. For example, each of the call-stack stores can be implemented as a database or a system that can maintain transactional semantics and synchronize the access and update of data. Maintaining the test data, such as traversed code paths, in central call-stack store 152 and synchronizing the data with local call-stack stores 122-125 enables the test data to be shared among workstations 102-105.

Figure 2:
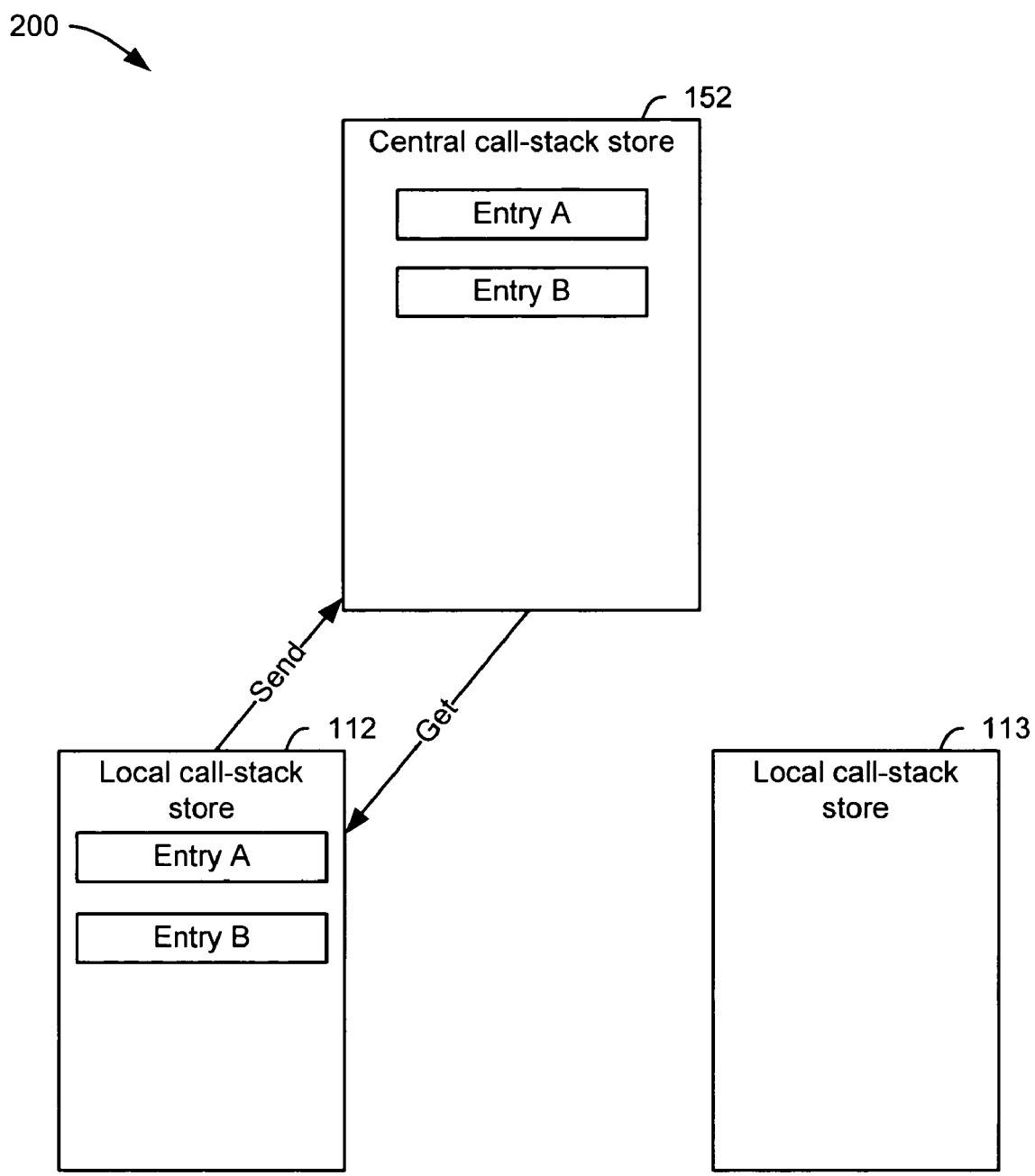
FIG. 2, 3 and 4 show an example process for synchronizing data in local call-stack stores with a central call-stack store.
Figure 3:
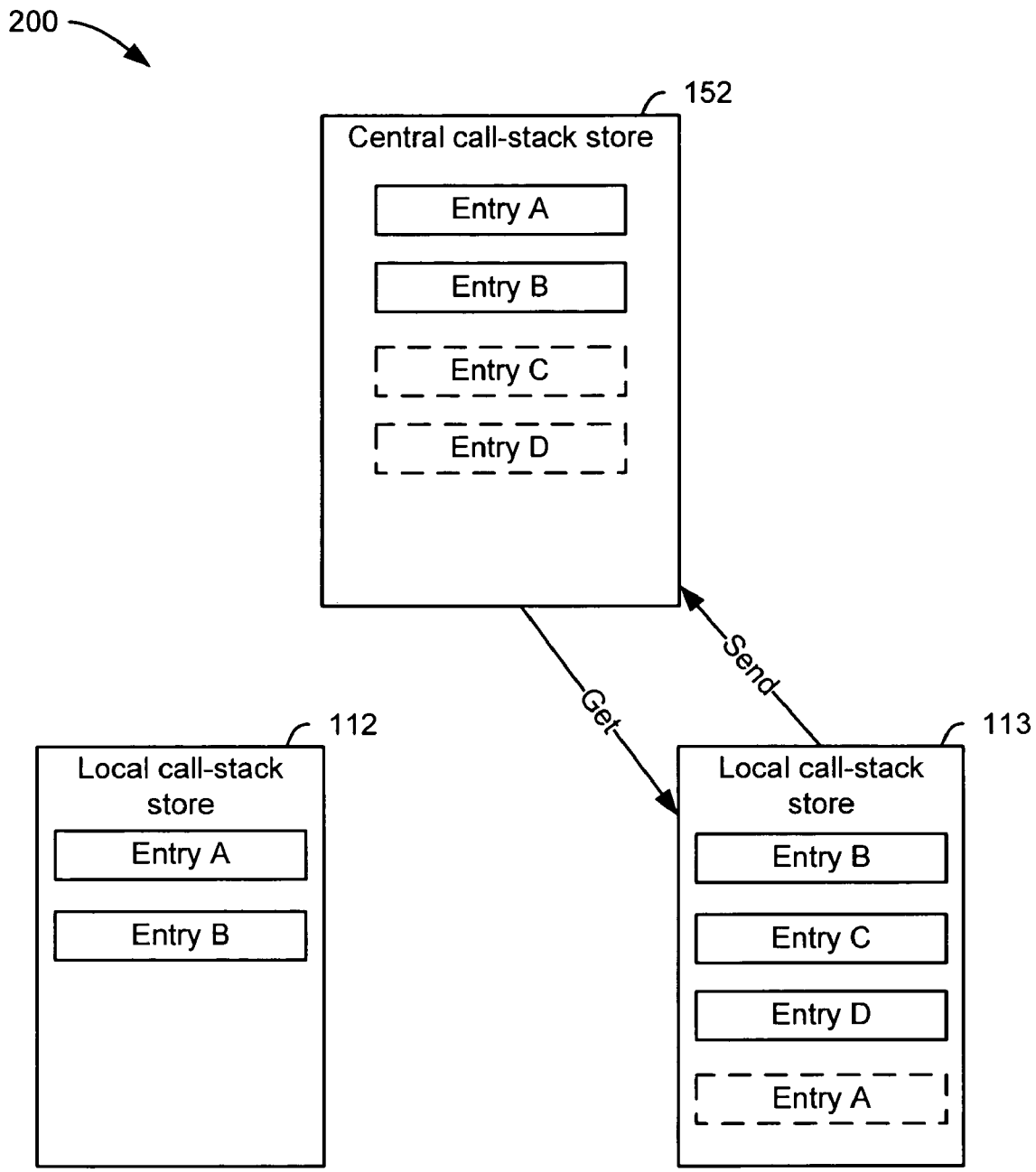
Figure 4:
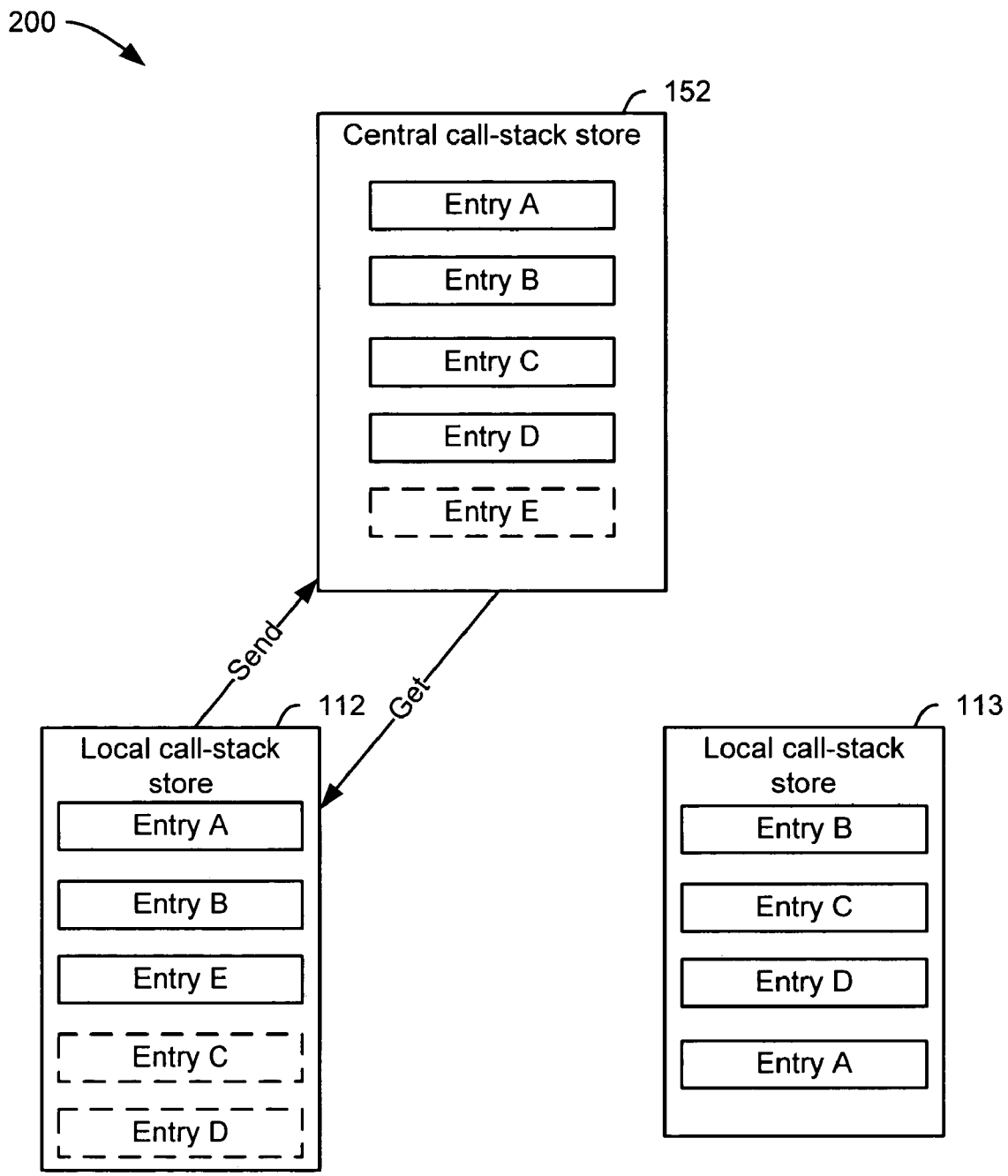

FIG. 2, 3 and 4 show an example process 200 for synchronizing data in local call-stack stores 112-115 with central call-stack store 152. For this example, a particular executable component is being tested by multiple workstations in a distributive manner by testing system 100. For illustrative purposes, only local call-stack stores 112-113 are shown in FIG. 2, 3 and 4 as example. In FIG. 2, workstation 102 performed a test on the executable component where two code paths of the component were traversed. These code paths were recorded as entries A and B in local call-stack store 112 as hashed stacks. Workstation 102 then synchronizes local call-stack store 112 with central call-stack store 152. For example, workstation 102 may be configured to send entries A and B in local call-stack store 112 to server 150, which updates central call-stack store 152 with the entries. Server 150 may then send any new entry in central call-stack store 152 to workstation 102. For the example in FIG. 2, central call-stack store 152 does not include any new entry.

In FIG. 3, workstation 103 performed a separate test on the same executable component that was tested by workstation 102. The test performed by workstation 103 traversed three code paths of the executable component. These code paths were recorded as entries B, C and D in local call-stack store 113. After the test, workstation 103 synchronizes local call-stack store 113 with central call-stack store 152. For example, workstation 103 sends entries B, C, and D to server 150 for synchronizing with data in central call-stack store 152. In this example, central call-stack store 152 already includes entry B but does not include entries C and D. Thus, entries C and D are added to central call-stack store 152. Server 150 sends entry A to local call-stack store 152. Workstation 103 adds entry A to local call-stack store 113. For further testing of the executable component, workstation 103 can skip the code path represented by stack entry A.

In FIG. 4, workstation 102 performed another test on the executable component and traversed a code path represented by entry E of local call-stack store 112. Workstation 102 then synchronizes local call-stack store 112 with central call-stack store 152. For example, server 150 may receive entries from local call-stack store 112 and add entry E to central call-stack store 152. Server 150 then sends entries C and D to workstation 102, which adds the entries to local call-stack store 112.

The example stack synchronization process 200 shown in FIG. 2, 3 and 4 enables workstations in a software testing system to test an executable component in a distributed manner. Specifically, the example process 200 enables the workstations to share information through a central call-stack store about which code paths of the executable component have already been traversed in tests. Thus, the workstations can efficiently perform separate tests, without repeatedly testing the same code paths. The example process 200 for maintaining a synchronized call-stack store also enables the workstations to execute a test past a particular point of failure to exhaustively test the executable component for exception handling. For example, after a workstation has experienced a failure, such as a machine crash, the workstation (as well as other workstations in the testing system) can recognize the last tested code path from the call-stack store and move on to the next code path, without repeatedly encountering the same failure. This allows the workstations to perform an exhaustive exception handling test of the executable component to completion on a single sweep.

Having synchronized call-stack stores further enables a testing system to be scalable and adaptable. In particular, a synchronized call-stack store allows newly added workstations to receive data regarding the current progress of the testing associated with the executable component and to immediately participate in the distributed testing.

Figure 5:
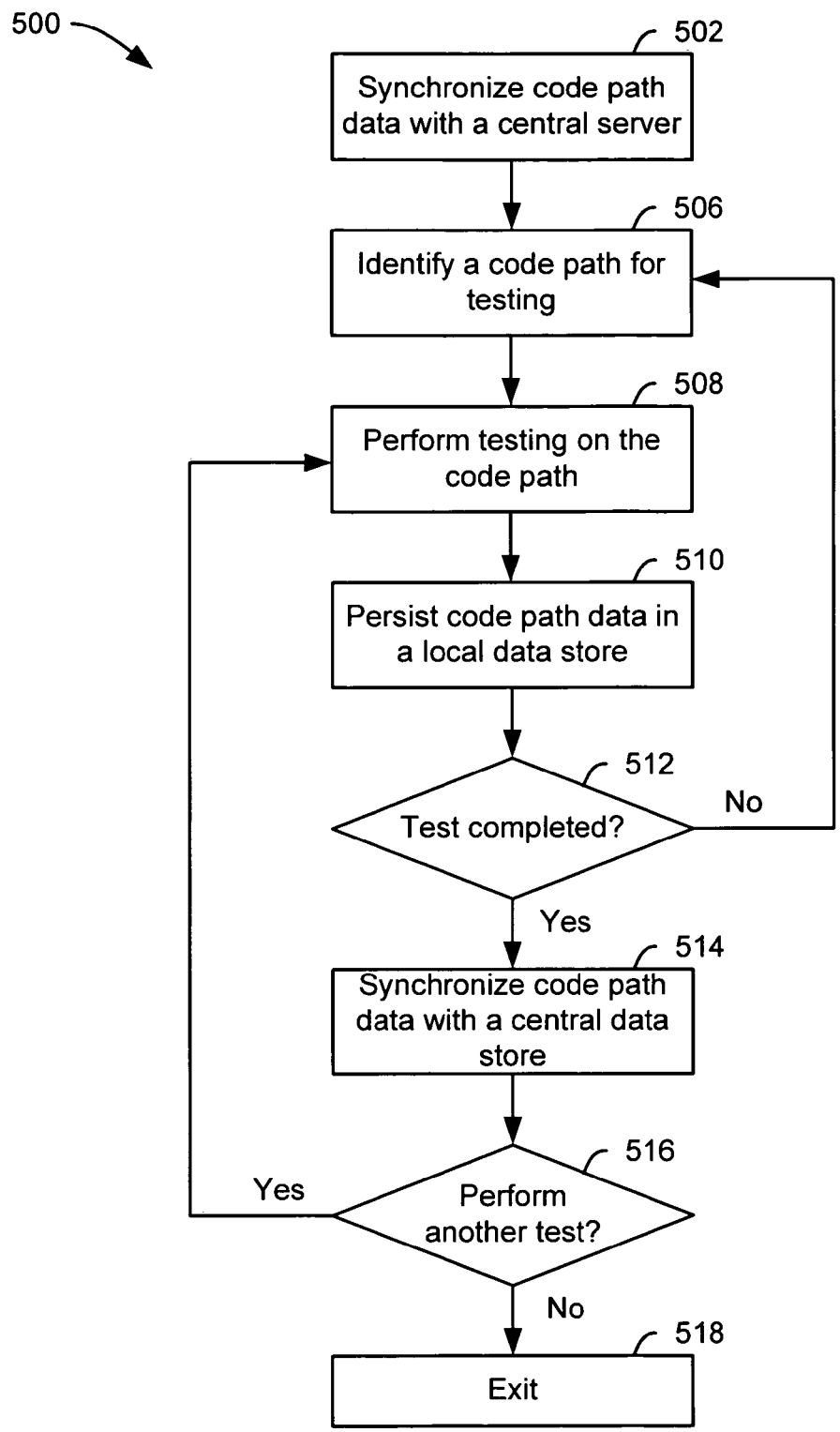
FIG. 5 shows an example process for performing tests in a distributed exception handling testing system.

FIG. 5 shows an example process 500 for performing tests in a distributed software testing system. Example process 500 may be implemented by a workstation to synchronize data for exhaustive handling testing with a central server. At block 502, code path data is synchronized with data in the server. The code path data may be maintained by the workstation as hashes of call stacks in a local call-stack store. When synchronized, the code path data enables the workstation to recognize code paths that have been traversed by other workstations in the distributed software testing system and by the workstation itself during tests that have already been performed.

At block 506, a code path is identified for testing. Typically, the workstation performs testing on code path that has not been identified by the code path data and, thus, has not been previously traversed. The test can be any type of test-like a regular functional test that exercises certain code paths. At block 508, testing is performed on the identified code path. At block 510, data about the tested code path is persisted in a local data store. The code path data may be stored as an entry in a call-stack store of the workstation as a hashed call-stack.

At decision block 512, a determination is made whether the test has been completed. A typical test covers multiple code paths with each code path having multiple points of potential failure (exception), which in turn translates to multiple exception handling code paths. If the test has not been completed, process 500 returns to block 506. If the test has been completed, the process continues at block 514 where the code path data of the workstation is re-synchronized with a central data store. For example, the workstation may send the code path data in the local data store to the server that manages code path data for all of the workstations in the distributed software testing system. The workstation may then receive from the server code path data that has been submitted by the other workstations. At decision block 516, a determination is made whether to perform another test. If so, process 500 returns to block 508. If not, the process exits at block 518.

Figure 6:
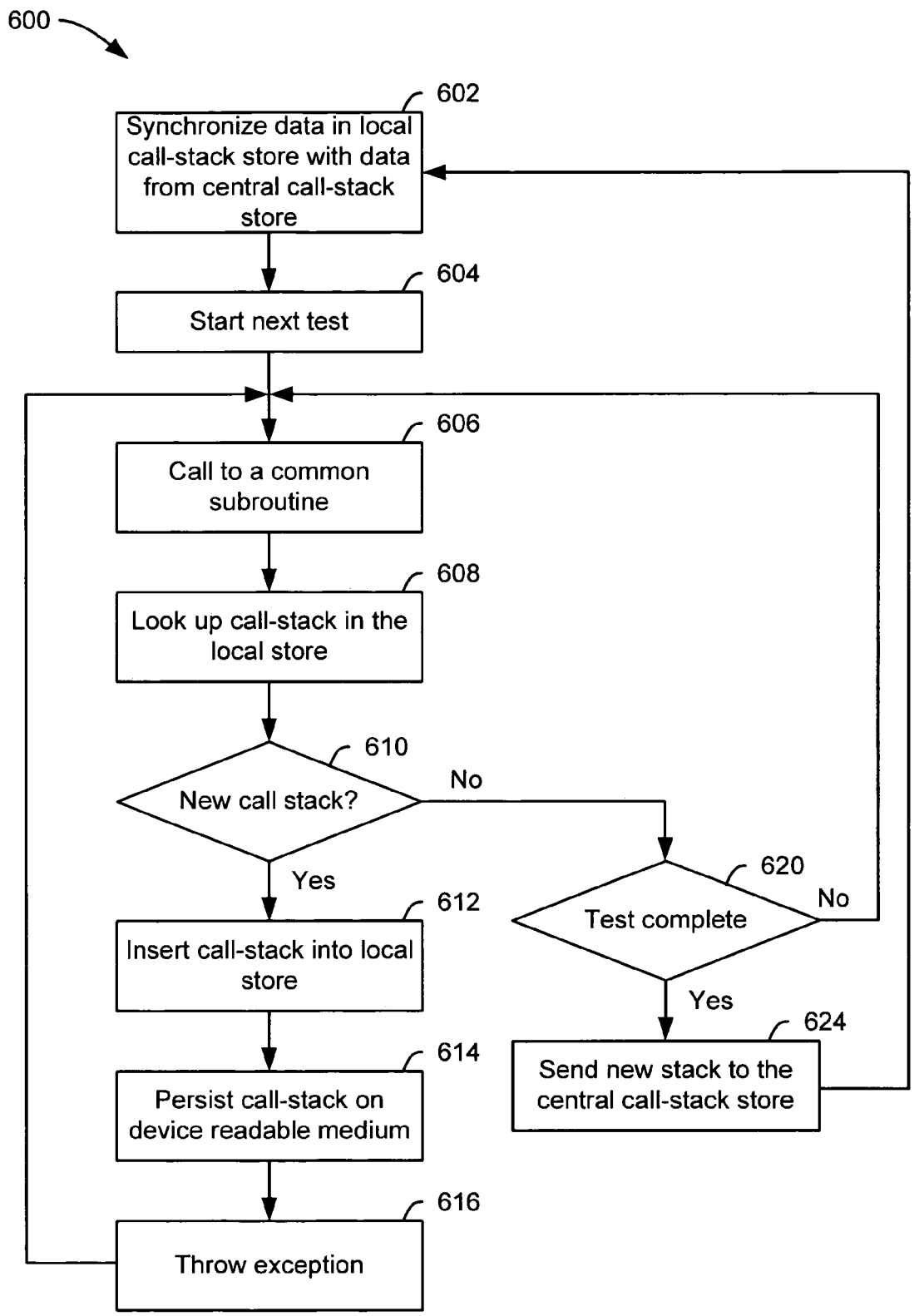
FIG. 6 shows an example process for synchronizing data in a local call-stack store with data in a central call-stack store for a distributed, exhaustive exception handling test.

FIG. 6 shows an example process 600 for synchronizing data in a local call-stack store with data in a central call-stack store for a test. Process 600 may be implemented by a workstation in the distributed software testing system for performing the test on an executable component. The local call-stack store may be maintained by the workstation. The central call-stack store may be maintained by a central server and may include hashed call-stacks provided by other workstations in the distributed software testing system. At block 602, data in the local call-stack store and the central call-stack store is synchronized. At block 604, a test of the executable component is started. At block 606, a call is made to a common subroutine, which is distributively tested by other workstations in the system. At block 608, the workstation looks up call-stack associated with the testing of the subroutine.

At decision block 610, a determination is made whether the present call-stack is a new one or not. If not, process 600 moves to decision block 620 where a determination is made whether the test has been completed. If not, process 600 returns to block 606. If the test has been completed, the process continues at block 624 where the new stacks associated with the current test are sent to the central call-stack store. Process 600 then returns to block 602.

Returning to decision block 610, if the call stack found is a new one, process 600 goes to block 612 where the call stack is inserted into the local store. At block 614, the call stack is persisted on a device-readable medium, such as a disk. At block 616, an exception is thrown, and the executable component being tested is expected to handle the exception appropriately. Process 600 then returns to block 606.

Figure 7:
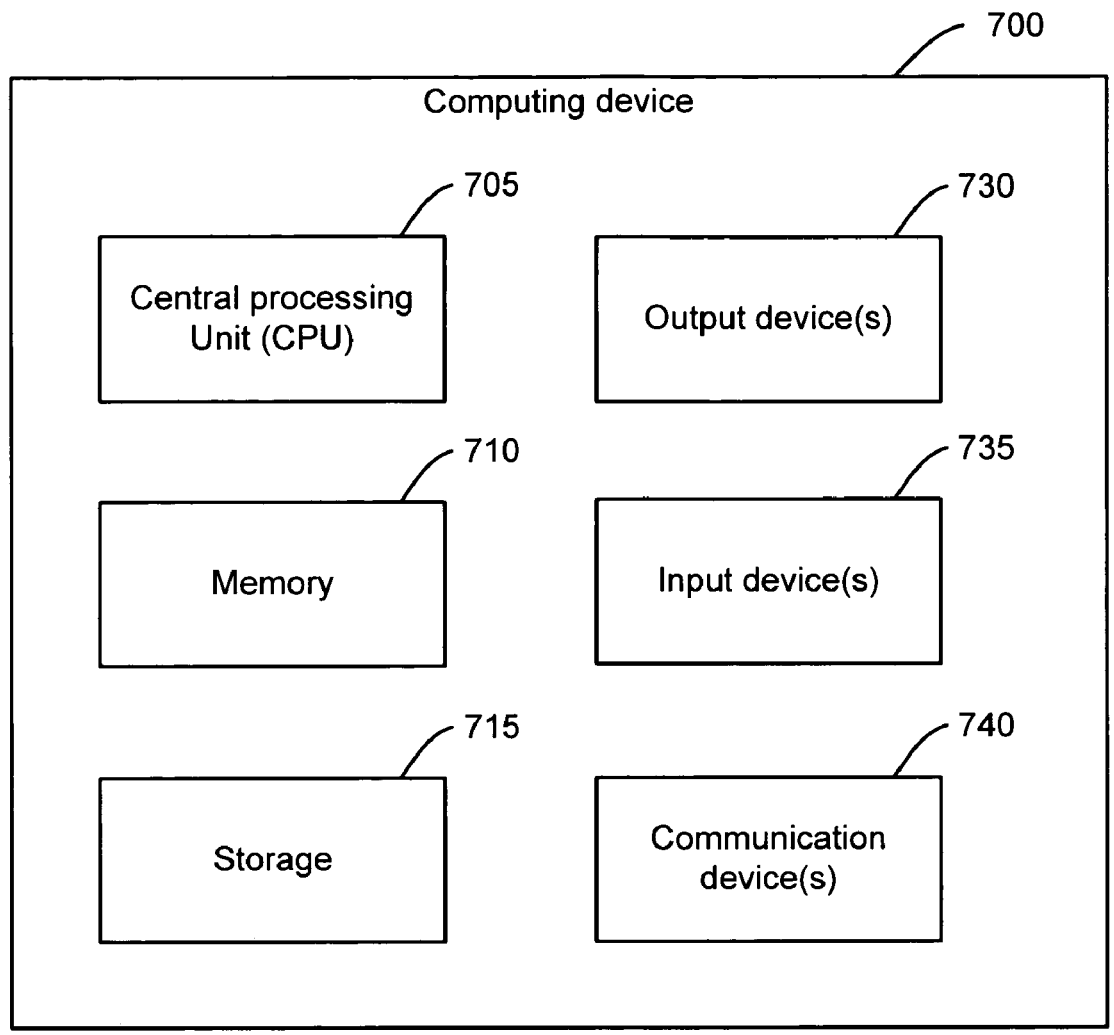
FIG. 7 shows an exemplary computer device for implementing the described systems and methods.

FIG. 7 shows an exemplary computer device 700 for implementing the described systems and methods. In its most basic configuration, computing device 700 typically includes at least one central processing unit (CPU) 705 and memory 710.

Depending on the exact configuration and type of computing device, memory 710 may be volatile (such as RAM), non-volatile (such as ROM, flash memory, etc.) or some combination of the two. Additionally, computing device 700 may also have additional features/functionality. For example, computing device 700 may include multiple CPU's. The described methods may be executed in any manner by any processing unit in computing device 700. For example, the described process may be executed by multiple CPU's in parallel.

Computing device 700 may also include additional storage (removable and/or non-removable) including, but not limited to, magnetic or optical disks or tape. Such additional storage is illustrated in FIG. 7 by storage 715. Computer storage media includes volatile and nonvolatile, removable and non-removable media implemented in any method or technology for storage of information such as computer readable instructions, data structures, program modules or other data. Memory 710 and storage 715 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 700. Any such computer storage media may be part of computing device 700.

Computing device 700 may also contain communications device(s) 740 that allow the device to communicate with other devices. Communications device(s) 740 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 700 may also have input device(s) 735 such as keyboard, mouse, pen, voice input device, touch input device, etc. Output device(s) 730 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more computer storage media storing device-executable instructions for performing steps comprising:
    synchronizing data in a local data store with data in a central data store associated with a software testing system;
    identifying, in the synchronized data, code paths that have been traversed by workstations associated with the testing system, the code paths associated with an executable component being distributively tested by the workstations;
    configuring a test based, at least in part, on the identified code paths; and
    performing the test on the executable component.

2. The one or more computer storage media as recited in claim 1, the steps further comprising:
    persisting code paths traversed by the performed test in the local data store; and
    when the test has been completed, re-synchronizing the data in the local data store with the data in the central data store.

3. The one or more computer storage media as recited in claim 2, the configuring step further comprising:
    identifying a subroutine associated with the executable component;
    determining code paths calling the subroutine that are not identified in the synchronized data; and
    configuring the test to traverse the determined code paths.

4. The one or more computer storage media as recited in claim 3, the performing step further comprising:
    identifying all exceptions generated by the determined code paths;
    raising the exceptions at points of potential failure;
    forcing the executable component to properly handle the exceptions; and
    logging the exceptions.

5. The one or more computer storage media as recited in claim 4, further comprising performing other tests on the identified subroutine until all code paths have been included in the local data store as being traversed by the workstations.

6. The one or more computer storage media as recited in claim 5, further comprising repeatedly performing tests until code paths in all subroutines associated with the executable component have been included in the local data store as being traversed by the workstations.

7. The one or more computer storage media as recited in claim 1, the steps further comprising:
    identifying a first code path, the first code path being associated with a failure of a first one of the workstations;
    and preventing a second one of the workstations from following the first code path.

8. The one or more computer storage media as recited in claim 1, wherein the executable component includes at least one of an application, an operating system, a subroutine, a function, and a script.

9. A software testing system comprising:
    a server including a central data store having data associated with an executable component; and
    workstations configured to communicate with the server, each workstation configured to perform distributed exception handling tests on the executable component and to persist data associated with the tests onto a local data store, the data including code paths of the executable component traversed by the distributed exception handling tests, each workstation further configured to synchronize the data in the local data store and the central data store on the server and to configure the distributed exception handling tests based on the synchronized data.

10. The software testing system as recited in claim 9, wherein each workstation is further configured to identify in the local data store code paths that have been traversed by tests previously performed by the workstations and to configure a new exception handling test with code paths that have not been traversed.

11. The software testing system as recited in claim 9, wherein the workstations are further configured to persist the traversed code paths in the local data stores as hashed call-stacks.

12. The software testing system as recited in claim 9, wherein the workstations are further configured to continue performing exception handling tests until all code paths of the executable component are included in the local data stores as being traversed.

13. The software testing system as recited in claim 9, wherein first one of the workstations is configured to be added to the software testing system after a second one of the workstations transmits to the server at least a portion of the data persisted on the local data store of the second one of the workstations.

14. The software testing system as recited in claim 9, wherein the central data store is a database system.

15. The software testing system as recited in claim 9, wherein the workstations are at least one of computing devices, servers, personal computers, and mobile devices.

16. A system comprising:
    means for providing a shared data structure accessible by devices associated with a distributed software testing system, the shared data structure associated with an executable component being distributively tested by the devices;
    means for each device to perform an exception handling test on the executable component;
    means for each device to indicate in a local data structure of the device the code paths that have been traversed by each exception handling test;
    means for synchronizing the local data structures of the devices with the shared data structure; and
    means for each device to configure the exception handling test based, at least in part, on the traversed the code paths indicated in the local data structure of the device.

17. The system as recited in claim 16, further comprising means for each device to use the code paths indicated in the local data structure that is synchronized with the shared data structure to avoid testing code paths that have already been previously traversed by at least one of another test or a workstation.

18. The system as recited in claim 16, further comprising means for each device to avoid a particular point of failure in a code path indicated in the synchronized, local data structure as being traversed by another test.

19. The system as recited in claim 16, further comprising means for the devices to use the synchronized, local data structures to distributively perform exception handling tests that exhaustively traversed all code paths of the executable component in a single sweep.

20. The system as recited in claim 16, further comprising means for a newly added device in the distributed software testing system to become aware of current progress of the exception handling tests being performed on the executable component using the local data structure that is synchronized with the shared data structure.

* * * * *

UNITED STATES PATENT AND TRADEMARK OFFICE
CERTIFICATE OF CORRECTION

| | |
|---|---|
| PATENT NO. | : 7,506,212 B2 |
| APPLICATION NO. | : 11/283574 |
| DATED | : March 17, 2009 |
| INVENTOR(S) | : Ranjani Ramamurthy et al. |

It is certified that error appears in the above-identified patent and that said Letters Patent is hereby corrected as shown below:

In column 1, line 18, before "following" insert -- The --.

In column 7, line 14, in Claim 13, after "wherein" insert -- a --.

Signed and Sealed this
Third Day of May, 2011

David J. Kappos
*Director of the United States Patent and Trademark Office*